(12) United States Patent
Kim et al.

(10) Patent No.: US 9,725,011 B2
(45) Date of Patent: Aug. 8, 2017

(54) SYSTEM AND METHOD FOR CONTROLLING EMERGENCY DRIVING FOR FUEL CELL VEHICLE

(71) Applicant: Hyundai Motor Company, Seoul (KR)

(72) Inventors: Sungdo Kim, Gyeonggi-Do (KR);
Minsu Kang, Gyeonggi-Do (KR);
Chang Seok Ryu, Gyeonggi-do (KR);
Dong Hun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 37 days.

(21) Appl. No.: 14/887,628

(22) Filed: Oct. 20, 2015

(65) Prior Publication Data

US 2016/0288666 A1  Oct. 6, 2016

(30) Foreign Application Priority Data

Mar. 30, 2015  (KR) .......................... 10-2015-0044486

(51) Int. Cl.
*B60L 11/18* (2006.01)
*B60L 7/10* (2006.01)
(Continued)

(52) U.S. Cl.
CPC .......... *B60L 11/1883* (2013.01); *B60L 3/003* (2013.01); *B60L 3/0069* (2013.01); *B60L 3/0092* (2013.01); *B60L 3/04* (2013.01); *B60L 3/12* (2013.01); *B60L 7/06* (2013.01); *B60L 7/14* (2013.01); *B60L 7/22* (2013.01); *B60L 11/005* (2013.01); *B60L 11/1803* (2013.01);
(Continued)

(58) Field of Classification Search
None
See application file for complete search history.

(56) References Cited

U.S. PATENT DOCUMENTS

| 4,124,812 A | * | 11/1978 | Naito | ....................... B60L 7/003 |
| | | | | 318/367 |
| 4,547,678 A | * | 10/1985 | Metzner | ................... B60L 11/14 |
| | | | | 290/40 C |

(Continued)

FOREIGN PATENT DOCUMENTS

| JP | 2013-192392 A | 9/2013 |
| KR | 10-2008-0044097 | 5/2008 |

(Continued)

*Primary Examiner* — Rami Khatib
(74) *Attorney, Agent, or Firm* — Mintz Levin Cohn Ferris Glovsky and Popeo, P.C.; Peter F. Corless (57) ABSTRACT

A system and a method are provided for controlling emergency driving of a fuel cell vehicle. The system includes a cutoff relay that connects or cuts off a current flow between a chopper and a supercapacitor. A connecting relay connects or cuts off a current flow between a power line to which a fuel cell and a driving motor are connected and the supercapacitor. An emergency driving relay includes a first terminal connected to a line branched from a ground line to which the fuel cell and the driving motor are connected and a second terminal connected between a braking resistor and the chopper. A power system controller is driven in an emergency driving mode to cutoff relay to be turned off and the connecting relay to be turned on during a short circuit of the chopper and turns the emergency driving relay on or off.

20 Claims, 4 Drawing Sheets

(51) Int. Cl.
*B60L 3/00* (2006.01)
*B60L 3/04* (2006.01)
*B60L 3/12* (2006.01)
*B60L 7/06* (2006.01)
*B60L 7/14* (2006.01)
*B60L 7/22* (2006.01)
*B60L 11/00* (2006.01)

(52) U.S. Cl.
CPC ....... *B60L 11/1868* (2013.01); *B60L 11/1885* (2013.01); *B60L 11/1887* (2013.01); *B60L 2210/14* (2013.01); *B60L 2240/547* (2013.01); *B60L 2240/549* (2013.01); *B60L 2250/16* (2013.01); *Y02T 90/34* (2013.01)

(56) References Cited

U.S. PATENT DOCUMENTS

| | | | | |
|---|---|---|---|---|
| 4,580,083 | A * | 4/1986 | Omae | H02P 7/2985 318/139 |
| 2006/0156096 | A1* | 7/2006 | Sato | B60L 11/12 714/724 |

FOREIGN PATENT DOCUMENTS

| | | |
|---|---|---|
| KR | 10-2008-0095311 A | 10/2008 |
| KR | 10-2011-0053671 A | 5/2011 |
| KR | 10-1047651 | 7/2011 |
| KR | 10-2013-0042149 | 4/2013 |

* cited by examiner

SYSTEM AND METHOD FOR CONTROLLING EMERGENCY DRIVING FOR FUEL CELL VEHICLE

CROSS-REFERENCE TO RELATED APPLICATION

This application claims priority to and the benefit of Korean Patent Application No. 10-2015-0044486 filed in the Korean Intellectual Property Office on Mar. 30, 2015, the entire contents of which are incorporated herein by reference.

BACKGROUND (a) Field of the Invention

The present invention relates to a system and a method for controlling an emergency driving for a fuel cell vehicle.

(b) Description of the Related Art

Generally, a fuel cell vehicle uses a fuel cell as a main power supply and a supercapacitor as an auxiliary power supply. The fuel cell vehicle configured to use a braking resistor to prevent an overvoltage of the typical supercapacitor has used a control method for detecting and cutting off the occurrence of a short-circuit of a semiconductor device (IGBT) of a chopper which is an electrical contact apparatus of a braking resistor circuit.

Figure 1:
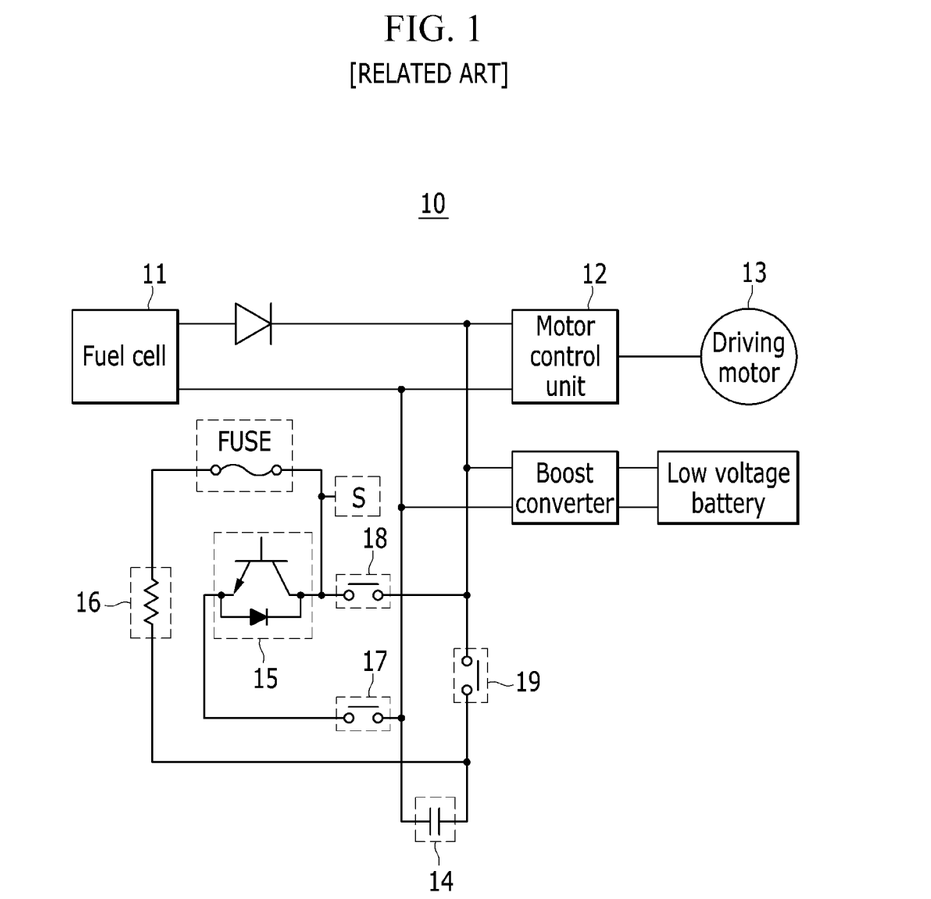
FIG. 1 illustrates a power system of the typical fuel cell vehicle according to the related art.

FIG. 1 illustrates a power system of the typical fuel cell vehicle according to the related art. Referring to FIG. 1, a power system 10 of the typical fuel cell vehicle includes a supercapacitor 14 charged with a voltage generated from a fuel cell 11 and a driving motor 13 during regenerative braking, a chopper 15 configured to prevent an overvoltage of the supercapacitor 14, and a braking resistor 16.

The power system 10 is configured to turn on a supercapacitor cutoff relay 17 when a chopper short-circuit error code is not present in a chopper controller flash memory during the starting of the fuel cell vehicle. When being driven in an initial charging mode of the supercapacitor 14, the power system 10 is configured to turn on an initial charging relay 18 after the fuel cell 11 generates a voltage to initially charge the supercapacitor 14 through the braking resistor 16.

Further, the power system 10 is configured to turn on a supercapacitor connecting relay 19 to connect the supercapacitor 14 to a main circuit when a difference between the voltage of the fuel cell 11 and the voltage of the supercapacitor 14 is reduced to a predetermined level due to the initial charging of the supercapacitor 14. The power system 10 for the fuel cell using the regenerative braking as the auxiliary braking means may consume electrical energy as thermal energy and reduce a voltage using the braking resistor 16 and the chopper 15 to prevent the voltage of the supercapacitor 14 from excessively increasing due to the substantial amount of regenerative braking during a deceleration in a high load.

However, in the typical power system 10, a deceleration of a downhill is sustained and thus, the voltage of the supercapacitor 14 may approach a threshold voltage or a substantial current may flow in the braking resistor through the chopper 15 by the regenerating braking energy. In particular, the supercapacitor connecting relay 19 is turned off during the short-circuit of the chopper 15 to separate the supercapacitor 14 which is the auxiliary power supply from the main circuit. Voltages of high voltage terminal capacitors of various power parts suddenly increase during this process, causing potential damage due to a voltage exceeding a withstanding voltage limitation of a power device.

The above information disclosed in this section is merely for enhancement of understanding of the background of the invention and therefore it may contain information that does not form the prior art that is already known in this country to a person of ordinary skill in the art.

SUMMARY

The present invention provides a system and a method for controlling an emergency driving for a fuel cell vehicle having advantages of preventing a sudden cut off of a supercapacitor during a failure of a chopper of the fuel cell vehicle and guiding stable maintenance through the emergency driving.

An exemplary embodiment of the present invention provides a system for controlling emergency driving of a fuel cell vehicle that may include a supercapacitor configured to be charged with a voltage generated from a fuel cell and a voltage generated by regenerative braking of a driving motor, a chopper configured to adjust a current amount supplied to the supercapacitor to prevent an overvoltage due to the regenerative braking, and a braking resistor configured to consume a regenerative braking current. The system may include a cutoff relay configured to connect or cutoff a current flow between the chopper and the supercapacitor; a connecting relay configured to connect or cutoff a current flow between a power line to which the fuel cell and the driving motor are connected and the supercapacitor; an emergency driving relay having one terminal connected to a line branched from a ground line to which the fuel cell and the driving motor are connected and the other terminal connected between the braking resistor and the chopper; and a power system controller configured to be driven in an emergency driving mode which operates the cutoff relay to be turned off and the connecting relay to be turned on at during a short circuit of the chopper and operates the emergency driving relay to be turned on or off.

The power system controller may be configured to monitor the voltage of the supercapacitor using a capacitor voltage monitoring in the emergency driving mode and when the voltage of the supercapacitor is equal to or greater than a preset threshold voltage, operate the emergency driving relay to be turned on. The power system controller may also be configured to operate the emergency driving relay to be turned off when the voltage of the supercapacitor is less than the preset threshold voltage in the emergency driving mode.

The power system controller may be configured to store a chopper failure code when the chopper is short-circuited while the fuel cell vehicle is being driven. Additionally, the power system controller may be configured to shift the fuel cell vehicle to the emergency driving mode when the chopper failure code is confirmed in the memory while restarting the fuel cell vehicle and store an accumulated frequency of starting of the emergency driving and an accumulated distance of the emergency driving.

The power system controller may be configured to forcibly turn off the fuel cell vehicle when the accumulated frequency of starting of the emergency driving exceeds a predetermined allowable frequency or the accumulated distance of the emergency driving exceeds a predetermined allowable distance. The power system controller may then be configured to display a failure state of the chopper via a display of a cluster or an audio video navigation (AVN) to allow a driver to detect the failure state. The power system controller may be configured to determine that the chopper is short-circuited when a current value of the braking resistor measured by a braking resistor current sensor continuously exceeds a preset current value for a predetermined time, when the chopper is maintained in an off-state.

Another exemplary embodiment of the present invention provides a method for controlling emergency driving of a fuel cell vehicle of an emergency driving system that may include a supercapacitor configured to be charged with a voltage generated from a fuel cell and a voltage generated by regenerative braking of a driving motor, a chopper configured to adjust a current amount supplied to the supercapacitor to prevent an overvoltage due to the regenerative braking, and a braking resistor configured to consume a regenerative braking current. The method may include determining whether a chopper is short-circuited by referring to a chopper failure code when the fuel cell vehicle is started; entering an emergency driving mode in response to determining that the chopper is short-circuited, turning off a cutoff relay, which connects a flow of current between the chopper and the supercapacitor, and maintaining a connecting relay, which connects a flow of current between a power line to which the fuel cell and a driving motor are connected and the supercapacitor, in an on-state; and turning an emergency driving relay on or off, wherein the emergency driving relay may have one terminal connected to a line branched from a ground line to which the fuel cell and the driving motor are connected and the other terminal connected between the braking resistor and the chopper, in the emergency driving mode.

The turning on or off of the emergency driving relay may include monitoring a voltage of the supercapacitor using a capacitor voltage monitoring and when the voltage of the supercapacitor is equal to or greater than a preset threshold voltage, operating the emergency driving relay to be turned on. The turning of the turn on or off of the emergency driving relay may further include operating the emergency driving relay to be turned off when the voltage of the supercapacitor is less than the preset threshold voltage.

The method may further include: storing the chopper failure code in a memory when the chopper is short-circuited and determining that the chopper is short-circuited when a current value of the braking resistor measured by a braking resistor current sensor continuously exceeds a preset current value for a predetermined time, when the chopper is maintained in an off-state. The method may further include: forcibly turning off the fuel cell vehicle when an accumulated frequency of starting of the emergency driving exceeds a predetermined allowable frequency and forcibly turning off the fuel cell vehicle when an accumulated distance of the emergency driving exceeds a predetermined allowable distance.

Additionally, the method may include: displaying a remaining allowable frequency of emergency driving or a remaining distance of emergency driving via a cluster or an audio video navigation (AVN) in the emergency driving mode and searching for a service station closest from a position of the fuel cell vehicle and guiding the fuel cell vehicle to the service station. The method may further include: maintaining the emergency driving relay in a turn off state in response to determining that the chopper is driven normally (e.g., without failure or error).

According to an exemplary embodiment of the present invention, it may be possible to prevent the sudden cutoff of the supercapacitor due to the short-circuit failure of the chopper even when a considerable amount of regenerative braking current is transferred during the emergency driving, by additionally providing the separate emergency driving relay to improve the typical relay driving sequence.

Further, the vehicle driving performance rather than the fuel cell (FC) only mode may be the same during the moving of the vehicle toward the service station and therefore the traction case may be reduced, thereby predicting the improvement in marketability. The frequency and the distance of the emergency driving may be limited to the predetermined range to prevent the secondary damage due to the failure of the emergency driving relay and guide the stable maintenance, thereby increasing the reliability of goods.

BRIEF DESCRIPTION OF THE DRAWINGS

The above and other features of the present disclosure will be more apparent from the following detailed description taken in conjunction with the accompanying drawings.

DESCRIPTION OF SYMBOLS

100: System for controlling emergency driving
111: Fuel cell
112: Motor control unit
113: Driving motor
114: Supercapacitor
115: Chopper
116: Braking resistor
117: Cutoff relay
118: Initial charging relay
119: Connecting relay
120: Emergency driving relay
121: Braking resistor current sensor
122: Capacitor voltage monitoring
123: Boost converter
124: Low voltage battery
125: Power system controller

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Throughout the specification, a vehicle means a fuel cell vehicle according to an exemplary embodiment of the present invention even though a fuel cell is not described at a head part.

Hereinafter, a system and a method for controlling emergency driving of a fuel cell vehicle according to an exemplary embodiment of the present invention will be described in detail with the accompanying drawings.

Figure 2:
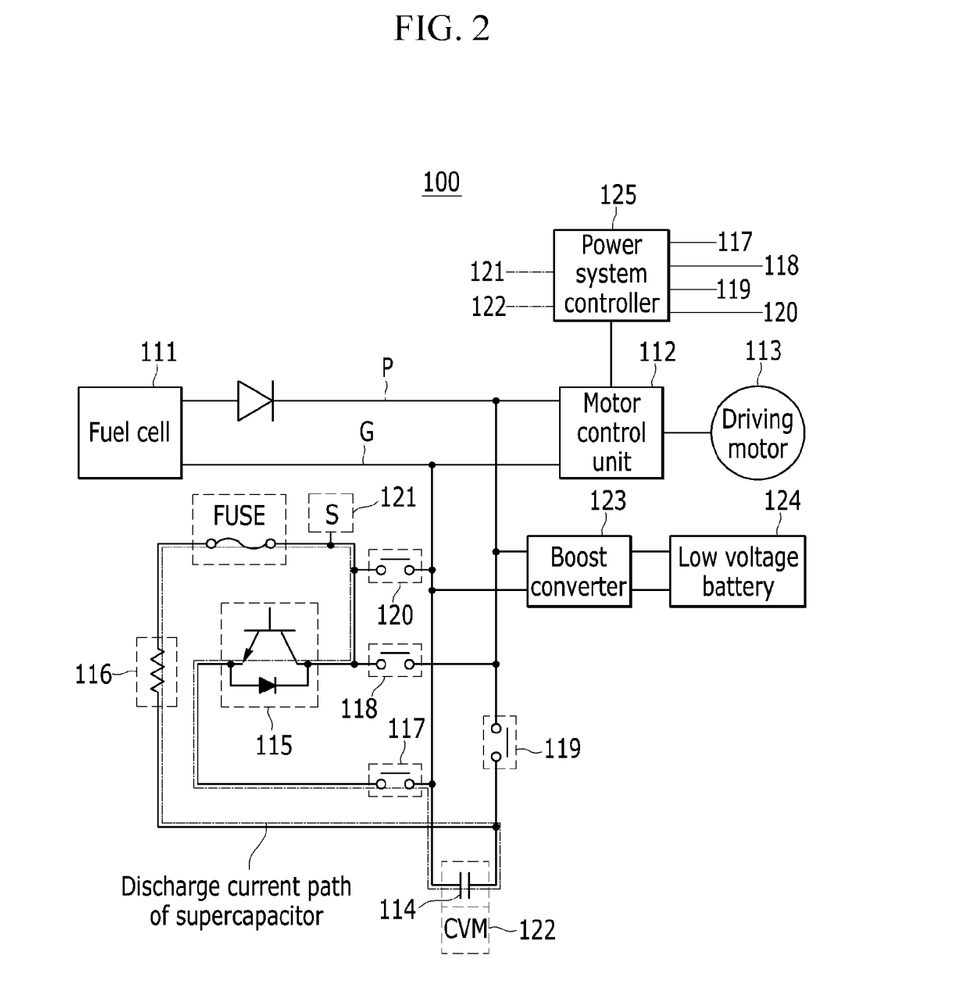
FIG. 2 is a diagram illustrating a system for controlling emergency driving of a fuel cell vehicle according to an exemplary embodiment of the present invention.

FIG. 2 is a diagram illustrating a system for controlling emergency driving of a fuel cell vehicle according to an exemplary embodiment of the present invention. Referring to FIG. 2, a system 100 for controlling emergency driving according to an exemplary embodiment of the present invention may include a fuel cell 111, a motor control unit (MCU) 112, a driving motor 113, a supercapacitor 114, a chopper 115, a braking resistor 116, a cutoff relay 117, an initial charging relay 118, a connecting relay 119, an emergency driving relay 120, a braking resistor current sensor 121, a capacitor voltage monitoring (CVM) 122, a boost converter 123, a low voltage battery 124, and a power system controller 125. Each component of the system 100 for controlling emergency driving may be connected by a main circuit including a power line P and a ground line G and lines branched therefrom.

The fuel cell 111 may be electrically connected to the power line connected to the driving motor 113 as a power source for a fuel cell vehicle and a boost converter 123 configured to supply power for operating the driving motor 113 and charging the supercapacitor 114. Hereinafter, connections between any two components mentioned herein means that the components are electrically connected to each other unless specifically mentioned.

The driving motor 113 may be operated the motor control unit 112 and may be connected to the power line to be supplied with power from the fuel cell 111 and the supercapacitor 114, to thus drive the fuel cell vehicle. Further, the driving motor 113 may be configured to provide power generated by regenerative braking to the supercapacitor 114. In other words, the driving motor 113 may be operated as a power generator during braking of the fuel cell vehicle to supply the power generated by the regenerative braking to the power line, thereby charging the supercapacitor 114.

The supercapacitor 114 may be connected to the power line via the connecting relay 119 and may be connected to the braking resistor 115 via the chopper 115. The connecting relay 119 may include a first terminal connected to the power line to which the fuel cell 111, the driving motor 113, and the boost converter 123 are connected and a second terminal connected to a first terminal of the supercapacitor 114 and a first terminal of the braking resistor 116. The connecting relay 119 may connect or cut off a flow of current between the power line and the supercapacitor 114 based on the control of the power system controller 125.

The chopper 115 may include a collector terminal connected to a second terminal of the braking resistor 116 to be connected to the power line via the braking resistor 116 and an emitter terminal connected to a second terminal of the supercapacitor 114. The chopper 115 may be operated to prevent an overvoltage of the supercapacitor 114 by the control signal of the power system controller 125 which may be input to the gate terminal. In particular, the chopper 115 may be configured to adjust a current amount supplied to the supercapacitor 114 by a turn on/off operation when regenerative power supplied from the driving motor 113 is an overvoltage, thereby preventing a shutdown of the fuel cell 111 and damage of the super capacitor 114.

In this configuration, the chopper 115 may be generally implemented as an insulated gate bipolar transistor (IGBT) which is a semiconductor device. The braking resistor 116 may include a first terminal connected between the connecting relay 119 and the supercapacitor 114 and a second terminal connected to the cutoff relay 117. The cutoff relay 117 may be configured to connect or cut off the flow of current between the chopper 115 and the supercapacitor 114. When the regenerative power of the driving motor 113 is an overvoltage, the braking resistor 116 may be configured to consume the overvoltage as thermal energy to prevent the supercapacitor 114 from being damaged.

The braking resistor current sensor 121 may be disposed between the emergency driving relay 120 and the braking resistor 116 and may be configured to detect a current that flows in the braking resistor 116 and transfer the detected current to the power system controller 125. A capacitor voltage monitoring (CVM) 122 device may be configured to monitor the voltage of the supercapacitor 114 and transfer the monitored voltage to the power system controller 125. The emergency driving relay 120 may include a first terminal connected to a line branched from the ground line G to which the driving motor 113 may be connected and a second terminal connected between the braking resistor 116 and the collector terminal of the chopper 115.

The emergency driving relay 120 may be configured to maintain a turn off state and may be turned on to replace the chopper 115 when the short circuit (e.g., a failure, error, abnormality, etc.) of the chopper 115 occurs, and thus may support the operating emergency driving control to prevent additional damage from occurring due to the regenerative braking even during the occurrence of the short circuit of the chopper 115. In other words, the emergency driving relay 120 may be configured to connect the braking resistor 116 to the driving motor 113 based on the control of the power system controller 125 even though the chopper 115 is short-circuited, thereby consuming the regenerative braking current.

The boost converter 123 may be connected to the low voltage battery 124 to supply a starting voltage to start the fuel cell vehicle. In other words, an output terminal of the boost converter 123 may be connected to the power line and an input terminal thereof may be connected to the low voltage battery 124. In particular, the low voltage battery 124 may be prepared for about 12 V or 24 V.

The initial charging relay 118 may include a first terminal connected to the line branched from the power line to which the supercapacitor 114 may be connected and a second terminal connected between the braking resistor 116 and the collector terminal of the chopper 115. The initial charging relay 118 may be opened and closed to charge the supercapacitor 114 with the voltage generated from the fuel cell 111 by the control of the power system controller 125 while starting the fuel cell vehicle. For example, the initial charging relay 118 may be configured to increase to a normal range in which an open circuit voltage (OCV) of the fuel cell 111 may be configured to supply high voltage power and then may be turned on to connect between the power line of the fuel cell 111 and the braking resistor 116. Therefore, when the initial charging relay 118 is turned on, the supercapacitor 114 may be charged with the power from the fuel cell 111 supplied through the braking resistor 116.

When the chopper 115 is short-circuited, the power system controller 125 may be configured to cut off (e.g., disconnect) the chopper 115 and connect the braking resistor 116 to the main circuit via the emergency driving relay 120, thereby performing the emergency driving consuming the regenerative braking current. In particular, the power system controller 125 may be configured to operate the emergency driving relay 120 to be turned on when a supercapacitor voltage Vcap measured by the capacitor voltage monitoring 122 is equal to or greater than a preset threshold voltage Vcap_limit to generate the braking resistor current, thereby inducing the decreasing of voltage of the supercapacitor 114. Further, the power system controller 125 may be configured to operate the emergency driving relay 120 to be turned off when the supercapacitor voltage Vcap is less than the threshold voltage Vcap_limit, thereby cutting off the braking resistor current.

Meanwhile, the power system controller 125 may be configured to store a failure code of the chopper 115 in a memory and display a failure state of the chopper 115 while restarting the fuel cell vehicle to shift the fuel cell vehicle to the emergency driving mode. In particular, the power system controller 125 may be configured to display the failure state of the chopper 115 via a display of a cluster or an audio video navigation (AVN) to allow a driver to recognize the failure state of the chopper 115 and guide the fuel cell vehicle to a service station near (e.g., in a vicinity of) the fuel cell vehicle within a rapid period of time.

Figure 3:
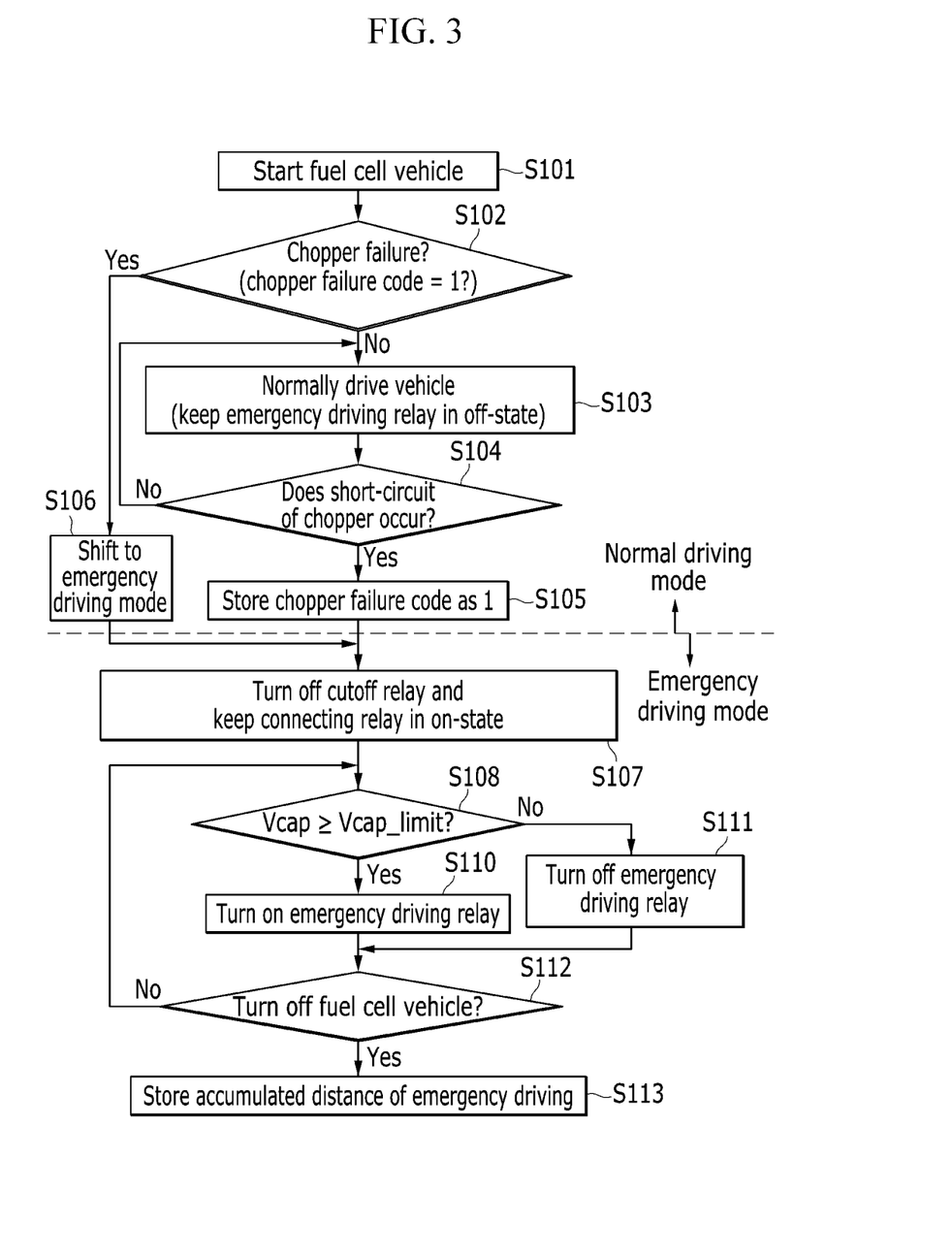
FIG. 3 is a flow chart illustrating a method for controlling emergency driving of a fuel cell vehicle according to an exemplary embodiment of the present invention.

Furthermore, a method for operating, by the power system controller 125, emergency driving of a fuel cell vehicle based on the configuration of the system 100 for controlling emergency driving of a fuel cell vehicle according to the exemplary embodiment of the present invention will be described with reference to FIG. 3. FIG. 3 is a flow chart illustrating a method for controlling emergency driving of a fuel cell vehicle according to an exemplary embodiment of the present invention.

Referring to FIG. 3, when the fuel cell vehicle is started (S101), the power system controller 125 according to the exemplary embodiment of the present invention may be configured to access the memory in which the state information of the chopper 115 may be stored to determine whether the chopper 115 is out of order (e.g., a failure occurs) (S102). Particularly, the state information of the chopper 115 may be information regarding the chopper failure code stored as 1 when abnormality such as the short circuit of the chopper 115 is detected and the chopper failure code stored as 0 when the chopper 115 is driven without error or failure (e.g., driven normally), during the previous driving of the fuel cell vehicle.

The power system controller 125 may be configured to maintain the emergency driving relay 120 in an off-state and drive the fuel cell vehicle normally (S103) in response to determining that the chopper 115 is driven with no error (S102; NO). In other words, the emergency driving relay 120 may replace the role of the chopper 115 when the chopper 115 fails and maintain the off-state when the fuel cell vehicle is driven normally.

The power system controller 125 may be configured to store the chopper failure code as 1 and may be operated in the emergency driving mode (S105) when the chopper 115 is short-circuited during the normal driving of the fuel cell vehicle (S104: Yes). In particularly, the power system controller 125 may be configured to monitor the current value detected by the braking resistor current sensor 121 during the driving of the fuel cell vehicle to determine whether the chopper 115 is short-circuited. For example, the power system controller 125 may be configured to determine that the chopper 115 is short-circuited when the current value measured by the braking resistor current sensor 121 continuously exceeds a preset current value for a predetermined time, when the chopper 115 is maintained in the off-state. Further, the power system controller 125 is not limited to the determination example regarding whether the chopper 115 is short-circuited and therefore may be configured to determine whether the chopper 115 is short-circuited using known various methods.

Meanwhile, in the step S102, the power system controller 125 may be configured to shift the fuel cell vehicle to the emergency driving mode (S106) in response to determining that the chopper failure code of the memory is stored as 1 and thus the chopper 115 fails (short-circuited) (S102; Yes). Therefore, the operation of the fuel cell vehicle in the emergency driving mode due to the occurrence of the short circuit of the chopper 115 will be continuously described. When entering the emergency driving mode due to the failure of the chopper 115, the power system controller 125 may be configured to turn off the cutoff relay 117 and maintain the connecting relay 119 in an on-state (S107).

The power system controller 125 may be configured to monitor the supercapacitor voltage Vcap using the capacitor voltage monitoring device 122 to turn on the emergency driving relay 120 (S110) when the supercapacitor voltage Vcap is equal to or greater than the preset threshold voltage Vcap_limit (S108; Yes). In other words, the power system controller 125 may be configured to turn on the emergency driving relay 120 to generate the braking resistor current to induce the falling of voltage of the supercapacitor 114. Therefore, when the regenerative braking current is excessive during the emergency driving, the power system controller 125 may be configured to prevent the voltage of the supercapacitor 115 from suddenly increasing, thereby preventing the supercapacitor 114 from being damaged. The power system controller 125 may also be configured to turn off the emergency driving relay 120 (S111) when the supercapacitor voltage Vcap is less than the preset threshold voltage Vcap_limit (S108; No).

Furthermore, the power system controller 125 may be configured to continuously monitor the voltage of the supercapacitor 114 before the fuel cell vehicle is turned off and consume the regenerative braking current by the turn on-off control of the emergency driving relay 120 in some sections, thereby executing the stable emergency driving (S112, No). Additionally, the power system controller 125 may be configured to store an accumulated distance of the emergency driving in the memory and terminate the system (S113) when the fuel cell vehicle is turned off (S112, Yes). In particular, the stored accumulated distance of the emergency driving may be a driving distance of the vehicle by the emergency driving independent of the accumulated frequency of starting of the emergency driving from the time when the short circuit of the chopper 115 occurs and may be utilized to limit the repetitive emergency driving by the driver without properly repairing the vehicle later.

As described above, the exemplary embodiment of the present invention may cut off the chopper 115 when the short circuit of the chopper 115 occurs during the driving of the fuel cell vehicle and execute the emergency driving to replace the role of the existing chopper 115 with the emergency driving relay 120, thereby maintaining the driving performance of the vehicle. However, unlike the chopper 115, when the emergency driving relay 120 is driven to cut off the substantial amount of current, the failure may occur due to the accumulated damage of the electrical contact, and as a result the vehicle may be guided to the service station as soon as possible.

Therefore, the system 100 for controlling emergency driving of a fuel cell vehicle according to the exemplary embodiment of the present invention may limit the frequency of starting of the emergency driving or the driving distance when the vehicle is shifted to the emergency driving while restarting the vehicle, thereby instructing the driver to guide the vehicle to the service station as soon as possible to service the vehicle.

Figure 4:
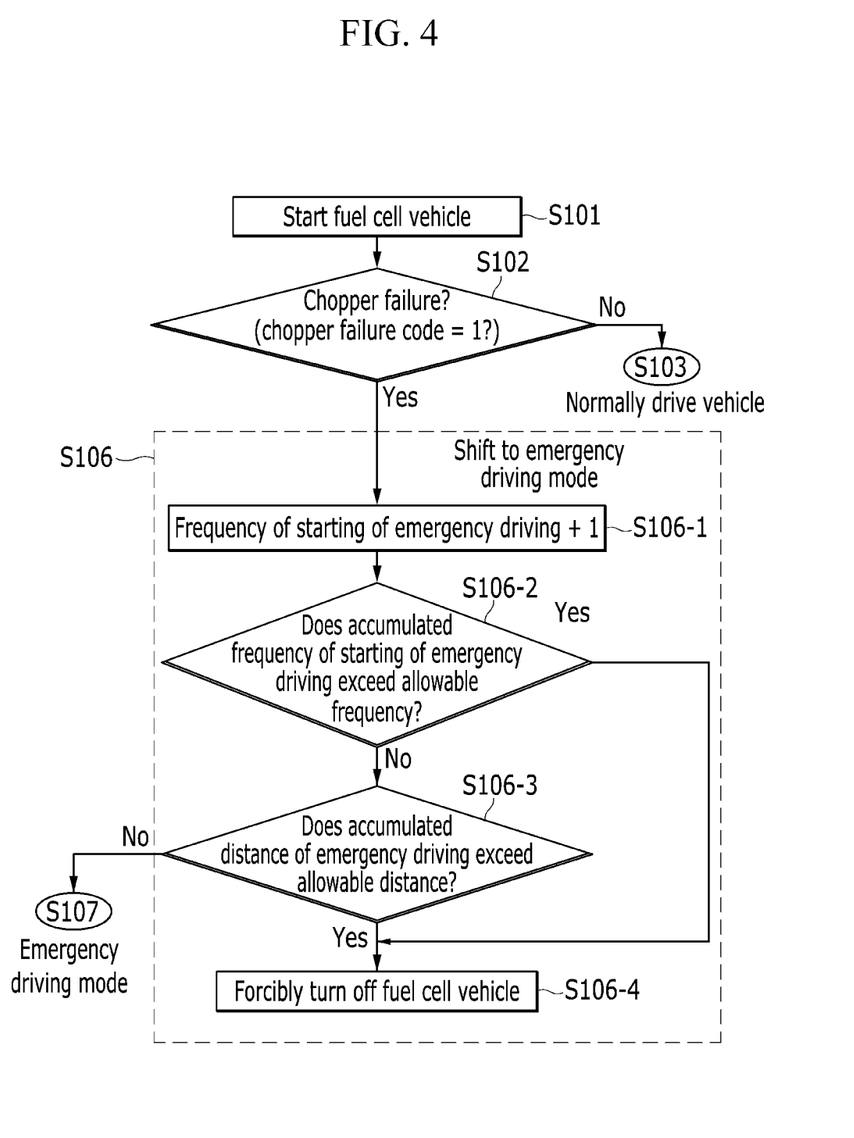
FIG. 4 is a flow chart illustrating a method for shifting a fuel cell vehicle to an emergency driving during restarting of the fuel cell vehicle according to an exemplary embodiment of the present invention.

FIG. 4 is a flow chart illustrating a method for shifting a fuel cell vehicle to an emergency driving while restarting the fuel cell vehicle according to an exemplary embodiment of the present invention. Referring to FIG. 4, the power system controller 125 may be configured to shift the vehicle to the emergency driving mode (S106) in response to determining that the vehicle is restarted after the short circuit of the chopper 115 occurs and thus the chopper 115 fails (short-circuited) (S102; Yes).

In particular, the power system controller 125 may be configured to increase the accumulated frequency of starting of the emergency driving by 1 (S106-1) and thus when the accumulated frequency of starting of the emergency driving exceeds a predetermined allowable frequency (S106-2; Yes), forcibly turns off the vehicle (S106-4). For example, the power system controller 125 may no longer support the emergency driving mode and may be configured to forcibly turn off the vehicle when the accumulated frequency of starting of the emergency driving is four times (e.g., the number of times of starting in emergency driving mode) and the allowable frequency is up to three times greater than a predetermined allowable frequency. The predetermined allowable frequency may be set by a person of ordinary skill in the art in consideration of performance of the fuel cell vehicle.

Further, the power system controller 125 may be configured to forcibly turn off the vehicle (S106-4) when the accumulated distance of emergency driving stored in the memory exceeds a predetermined allowable distance (S106-3; Yes). The power system controller 125 may also be configured to perform a control in the emergency driving mode described with reference to FIG. 3 when the accumulated frequency of starting of the emergency driving is less than the allowable frequency (S103-2; No) or the accumulated distance of emergency driving is less than the allowable distance (S106-3; No). In particular, the power system controller 125 may be configured to display the remaining allowable accumulated frequency of starting of the emergency driving or the remaining distance of emergency driving via the cluster or the AVN when entering the emergency driving mode and search for a service station closest from the position of the vehicle and guide the vehicle to the service station.

According to above description, the related art may perform the emergency driving in a fuel cell (FC) only mode when maintaining the configuration and sequence of the relay but causes the damage of durability of the capacitor due to the overvoltage which is generated by the sudden increase of voltage of a plurality of power electronic parts configuring a power network when a considerable amount of regenerative braking current is transferred. Further, when a voltage exceeding a withstanding voltage of the power device (IGBT, etc.) of a power part is applied, a ripple effect of damage may increase caused by a non-reversible damage due to the overvoltage.

However, according to an exemplary embodiment of the present invention, it may be possible to prevent the sudden cutoff of the supercapacitor due to the short-circuit failure of the chopper even when a considerable amount of regenerative braking current is transferred during the emergency driving, by additionally providing the separate emergency driving relay to improve the typical relay driving sequence. Further, the vehicle driving performance rather than the fuel cell (FC) only mode is the same during the moving of the vehicle toward the service station and therefore the traction case may be reduced, thereby predicting the improvement in marketability.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A system for controlling emergency driving of a fuel cell vehicle including a supercapacitor configured to be charged with a voltage generated from a fuel cell and a voltage generated by regenerative braking of a driving motor, a chopper configured to adjust a current amount supplied to the supercapacitor to prevent an overvoltage due to the regenerative braking, and a braking resistor configured to consume a regenerative braking current, the system comprising:
a cutoff relay configured to connect or cutoff a flow of current between the chopper and the supercapacitor;
a connecting relay configured to connect or cutoff a flow of current between a power line to which the fuel cell and the driving motor are connected and the supercapacitor;
an emergency driving relay including a first terminal connected to a line branched from a ground line to which the fuel cell and the driving motor are connected and a second terminal connected between the braking resistor and the chopper; and
a power system controller configured to be driven in an emergency driving mode to operate the cutoff relay to be turned off and the connecting relay to be turned on during an occurrence of a short circuit of the chopper and turn on or off the emergency driving relay.

2. The system of claim 1, wherein the power system controller is configured to monitor a voltage of the supercapacitor using a capacitor voltage monitoring device in the emergency driving mode and when the voltage of the supercapacitor is equal to or greater than a preset threshold voltage, turn on the emergency driving relay.

3. The system of claim 2, wherein the power system controller is configured to turn off the emergency driving relay when the voltage of the supercapacitor is less than the preset threshold voltage in the emergency driving mode.

4. The system of claim 1, wherein the power system controller is configured to store a chopper failure code when the chopper is short-circuited while the fuel cell vehicle is driven.

5. The system of claim 4, wherein the power system controller is configured to shift the fuel cell vehicle to the emergency driving mode when the chopper failure code is confirmed in the memory while restarting the fuel cell vehicle and store an accumulated frequency of starting of the emergency driving and an accumulated distance of the emergency driving mode.

6. The system of claim 5, wherein the power system controller is configured to turn off the fuel cell vehicle when the accumulated frequency of starting of the emergency driving mode exceeds a predetermined allowable frequency or the accumulated distance of the emergency driving mode exceeds a predetermined allowable distance.

7. The system of claim 1, wherein the power system controller is configured to display a failure state of the chopper via a display of a cluster or an audio video navigation (AVN) to allow a driver to recognize the failure state.

8. The system of claim 1, wherein the power system controller is configured to determine that the chopper is short-circuited when a current value of the braking resistor measured by a braking resistor current sensor continuously exceeds a preset current value for a predetermined time, when the chopper is maintained in an off-state.

9. A method for controlling emergency driving of a fuel cell vehicle of an emergency driving system including a supercapacitor configured to be charged with a voltage generated from a fuel cell and a voltage generated by regenerative braking of a driving motor, a chopper configured to adjust a current amount supplied to the supercapacitor to prevent an overvoltage due to the regenerative braking, and a braking resistor configured to consume a regenerative braking current, the method comprising:
determining, by a controller, whether a chopper is short-circuited by referring to a chopper failure code when the fuel cell vehicle is started;
entering, by the controller, an emergency driving mode when the chopper is short-circuited, turn off a cutoff relay, which connects a flow of current between the chopper and the supercapacitor, and maintain a connecting relay, which connects a flow of current between a power line to which the fuel cell and a driving motor are connected and the supercapacitor, in an on-state; and
turning an emergency driving relay on or off, by the controller, wherein the emergency driving relay includes a first terminal connected to a line branched from a ground line to which the fuel cell and the driving motor are connected and a second terminal connected between the braking resistor and the chopper, in the emergency driving mode.

10. The method of claim 9, further comprising:
monitoring, by the controller, a voltage of the supercapacitor using a capacitor voltage monitoring; and
turning on, by the controller, the emergency driving relay when the voltage of the supercapacitor is equal to or greater than a preset threshold voltage.

11. The method of claim 10, further comprising:
turning off, by the controller, the emergency driving relay when the voltage of the supercapacitor is less than the preset threshold voltage.

12. The method of claim 9, further comprising:
storing, by the controller, the chopper failure code in a memory when the chopper is short-circuited.

13. The method of claim 9, further comprising:
determining, by the controller, that the chopper is short-circuited when a current value of the braking resistor measured by a braking resistor current sensor continuously exceeds a preset current value for a predetermined time, when the chopper is maintained in an off-state.

14. The method of claim 9, further comprising:
turning off, by the controller, the fuel cell vehicle when an accumulated frequency of starting of the emergency driving mode exceeds a predetermined allowable frequency.

15. The method of claim 9, further comprising:
turning off, by the controller, the fuel cell vehicle when an accumulated distance of the emergency driving mode exceeds a predetermined allowable distance.

16. The method of claim 9, further comprising:
determining, by the controller, an accumulated frequency and distance of the emergency driving mode;
determining, by the controller, a total number of allowable frequency and distance of the emergency driving mode to determine a remaining allowable frequency and a remaining distance of the emergency driving mode;
displaying, by the controller, the remaining allowable frequency of emergency driving mode or the remaining distance of emergency driving mode via a cluster or an audio video navigation (AVN) in the emergency driving mode; and searching, by the controller, for a service station closest from a position of the fuel cell vehicle and guiding the fuel cell vehicle to the service station.

17. The method of claim 9, further comprising:

maintaining, by the controller, the emergency driving relay in an off-state when the chopper is not short-circuited.

18. A non-transitory computer readable medium containing program instructions executed by a controller and for controlling emergency driving of a fuel cell vehicle of an emergency driving system including a supercapacitor configured to be charged with a voltage generated from a fuel cell and a voltage generated by regenerative braking of a driving motor, a chopper configured to adjust a current amount supplied to the supercapacitor to prevent an overvoltage due to the regenerative braking, and a braking resistor configured to consume a regenerative braking current, the computer readable medium comprising:

program instructions that determine whether a chopper is short-circuited by referring to a chopper failure code when the fuel cell vehicle is started;

program instructions that enter an emergency driving mode when the chopper is short-circuited, turn off a cutoff relay, which connects a flow of current between the chopper and the supercapacitor, and maintain a connecting relay, which connects a flow of current between a power line to which the fuel cell and a driving motor are connected and the supercapacitor, in an on-state; and program instructions that turn an emergency driving relay on or off wherein the emergency driving relay includes a first terminal connected to a line branched from a ground line to which the fuel cell and the driving motor are connected and a second terminal connected between the braking resistor and the chopper, in the emergency driving mode.

19. The non-transitory computer readable medium of claim 18, further comprising:

program instructions that determine that the chopper is short-circuited when a current value of the braking resistor measured by a braking resistor current sensor continuously exceeds a preset current value for a predetermined time, when the chopper is maintained in an off-state.

20. The non-transitory computer readable medium of claim 18, further comprising:

program instructions that determine an accumulated frequency and distance of the emergency driving mode;

program instruction that determine a total number of allowable frequency and distance of the emergency driving mode to determine a remaining allowable frequency and a remaining distance of the emergency driving mode;

program instructions that display the remaining allowable frequency of emergency driving or the remaining distance of emergency driving mode via a cluster or an audio video navigation (AVN) in the emergency driving mode; and program instructions that search for a service station closest from a position of the fuel cell vehicle and guide the fuel cell vehicle to the service station.

* * * * *